United States Patent
Harada

(10) Patent No.: US 7,502,130 B2
(45) Date of Patent: *Mar. 10, 2009

(54) CONTROL METHOD OF A HOST COMPUTER

(75) Inventor: Takuto Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 870 days.

This patent is subject to a terminal disclaimer.

(21) Appl. No.: 10/999,967

(22) Filed: Dec. 1, 2004

(65) Prior Publication Data

US 2005/0094187 A1 May 5, 2005

Related U.S. Application Data

(62) Division of application No. 08/458,841, filed on Jun. 2, 1995, now Pat. No. 6,862,100.

(30) Foreign Application Priority Data

| Jun. 9, 1994 | (JP) | ................................. 6-127244 |
| Jul. 27, 1994 | (JP) | ................................. 6-175293 |

(51) Int. Cl.
*G06K 15/00* (2006.01)
*G06F 3/12* (2006.01)

(52) U.S. Cl. .................................. 358/1.13; 358/1.1

(58) Field of Classification Search .................. 358/1.1, 358/1.9, 1.13, 1.14, 1.15, 1.18, 448, 402, 358/408, 1.12
See application file for complete search history.

(56) References Cited

U.S. PATENT DOCUMENTS

| 5,113,355 A | 5/1992 | Nomura .................. 395/109 |
| 5,228,118 A | 7/1993 | Sasaki ..................... 395/112 |
| 5,287,194 A | 2/1994 | Lobiondo ................ 395/114 |
| 5,327,526 A | 7/1994 | Nomura et al. ............ 395/115 |
| 5,337,258 A | 8/1994 | Dennis .................... 364/551.01 |
| 5,469,533 A | 11/1995 | Dennis .................... 395/114 |
| 5,752,036 A * | 5/1998 | Nakamura et al. ......... 717/149 |
| 6,750,980 B1 * | 6/2004 | Shimura et al. ........... 358/1.15 |

FOREIGN PATENT DOCUMENTS

| JP | 4-65259 | 3/1992 |
| JP | 6-1011 | 1/1994 |
| JP | 6-168084 | 6/1994 |

* cited by examiner

*Primary Examiner*—Gabriel I. Garcia
(74) *Attorney, Agent, or Firm*—Fitzpatrick, Cella, Harper & Scinto

(57) ABSTRACT

In a host computer connected to a printer, a determination is made as to whether data should be transmitted to the printer in a printer language or expanded into bit map image data before transmission, and the data in the printer language, or the expanded bit map image data, is transmitted to the printer. The determination of whether to transmit data in a printer language or expand into a bit map image before transmission is made based on an estimate of the time required for expansion by both the printer and by the host computer. If the printer can expand a first page of data into a bit map image in parallel with expansion by the host computer of a second page of data into bit map data, then the first page of data is transmitted in the printer language and the second page of data is expanded into pit map image data before transmission.

4 Claims, 10 Drawing Sheets

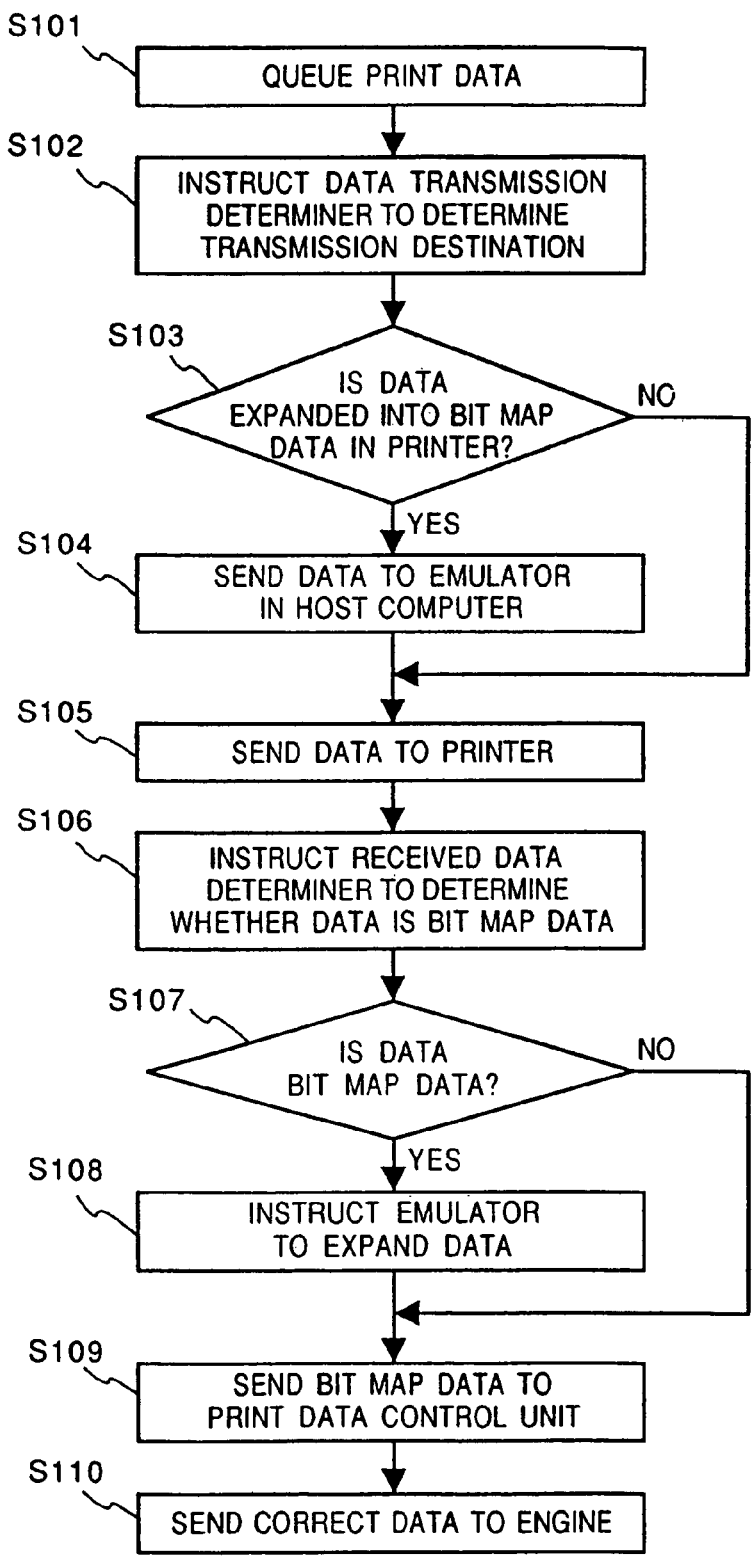
F I G. 9

CONTROL METHOD OF A HOST COMPUTER

This application is a division of application Ser. No. 08/458,841, filed Jun. 2, 1995, the contents of which are incorporated herein by reference.

BACKGROUND OF THE INVENTION

The present invention relates to a printer, and a control unit and method for the printer.

In general, a printer receives print data from a host computer or the like, analyzes the received print data, and produces bit map data. The printer produces a visible image on a recording medium using the produced bit map data and outputs the image.

A typical printer of the above kind is a page printer (in particular, a laser printer) which is rapidly winning popularity these days. In general, when this kind of printer is used, a host computer that is an upper-level unit transmits print data described in dedicated page description language.

The printer therefore analyzes the received print data (composed of various commands), translates it into intermediate-language data, and produces bit map data using the intermediate-language data.

The pager printer is being adopted more widely because of the high speed and excellent quality of output images. In some printers, a large-capacity storage such as a hard disk is installed and used as a printer buffer in an effort to release an upper-level unit from a job of outputting print data.

A printer having a storage stores received print data in the form of a file and prints data that has been stored first (hereinafter, an action of storing received print data in the form of a file in a storage is referred to as "spooling," and a resultant file is referred to as a "spool file").

A general system (comprising a host computer and a printer) will be described in conjunction with a functional block diagram of FIG. 1.

In response to a print instruction (entered by an operator) through any kind of running application program, a host computer 101 translates print data 102, which is instructed to print, into printer language-written data compatible with a printer 105. After saving some printer language-written data in a spooler 103 (designed to translate data into printer language-written data), the host computer 101 transmits the data into the printer 105 via a communication channel 104.

Meanwhile, the printer spools received data in a spooler 106, and fetches data in the order in which the oldest spool file is fetched first. The fetched data is then analyzed by an emulator 107. A bit map is then expanded in a memory on the basis of the result of analysis. After bit map data concerning one page is expanded in the memory, the data is transferred to a printer engine 108 according to a given procedure. Printing is then achieved.

When numerous spool files reside in the printer, time must be spent before printing of an intended spool file is started. The waiting time depends on the lengths of spool files printed before the printing of an intended spool file is started, and on the printing capability of the printer. This means that the waiting time depends on the processing capability of the printer.

The processing capability of a printer will be discussed. Processing performed by a printer includes analyzing commands contained in print data, expanding print data into bit map data in a print buffer on the basis of the result of analysis, and printing print data according to the bit map data expanded in the print buffer. Above all, printing based on bit map data (for example, for a laser beam printer, bit map data is transferred as video signals in order to drive semiconductor laser elements, and a latent image is formed on a photosensitive drum, developed, and then transferred to a recording medium) is fixed due to mechanical restraints. If a printer permits fast command analysis and fast bit map expansion, the printer would prove very useful.

SUMMARY OF THE INVENTION

The present invention attempts to solve the foregoing problems. An object of the present invention is to provide a printer, and a control unit and method for the printer which can provide an intended result of printing according to the state of a printer.

In order to accomplish the above object, a printer in accordance with the present invention has the components described below.

A printer for recording a visible image on a given recording medium using print data sent from an external unit and outputting the result of recording, comprising:
  a saving means for saving input print data in the form of files sequentially in a given storage means;
  a determining means for determining whether a file saved by said saving means is of a first type composed of commands described in printer language or of a second type containing a bit image to be printed;
  a control means that when said determining means determines that a file to be processed is of the first type, produces bit map data using the file and performs printing, and that when said determining means determines that a file to be processed is of the second type, prints a bit image contained in the file; and
  a returning means that when receiving given information from said external unit, returns information representing the length of a print queue to said external unit.

An external unit, comprising:
  a determining means that for transferring print data to a printer, transfers given information to said printer and determines the length of a print queue existent in said printer according to information sent from said printer, and
  an output means that according to the result of determination made by said determining means, outputs as print data either data described in printer language or data representing a bit image and deriving from said data described in printer language.

With the foregoing configuration, when receiving given information from the external-level unit, the printer returns information representing the length of a print queue existent in the printer to the external unit. The external-level unit determines on the basis the information whether data described in printer language or data representing a bit image and deriving from the data described in printer language, and provides the printer with either of the data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a flowchart describing job steps in the second embodiment; and

DETAILED DESCRIPTION OF THE PREFERRED EMBODIMENTS

Referring to the appended drawings, embodiments of the present invention will be described.

The structure of a printer of an embodiment will be described in conjunction with FIG. 3. In this embodiment, a laser beam printer (hereinafter, LBP) is given as an example. The present invention is not limited to the LBP.

Figure 3:
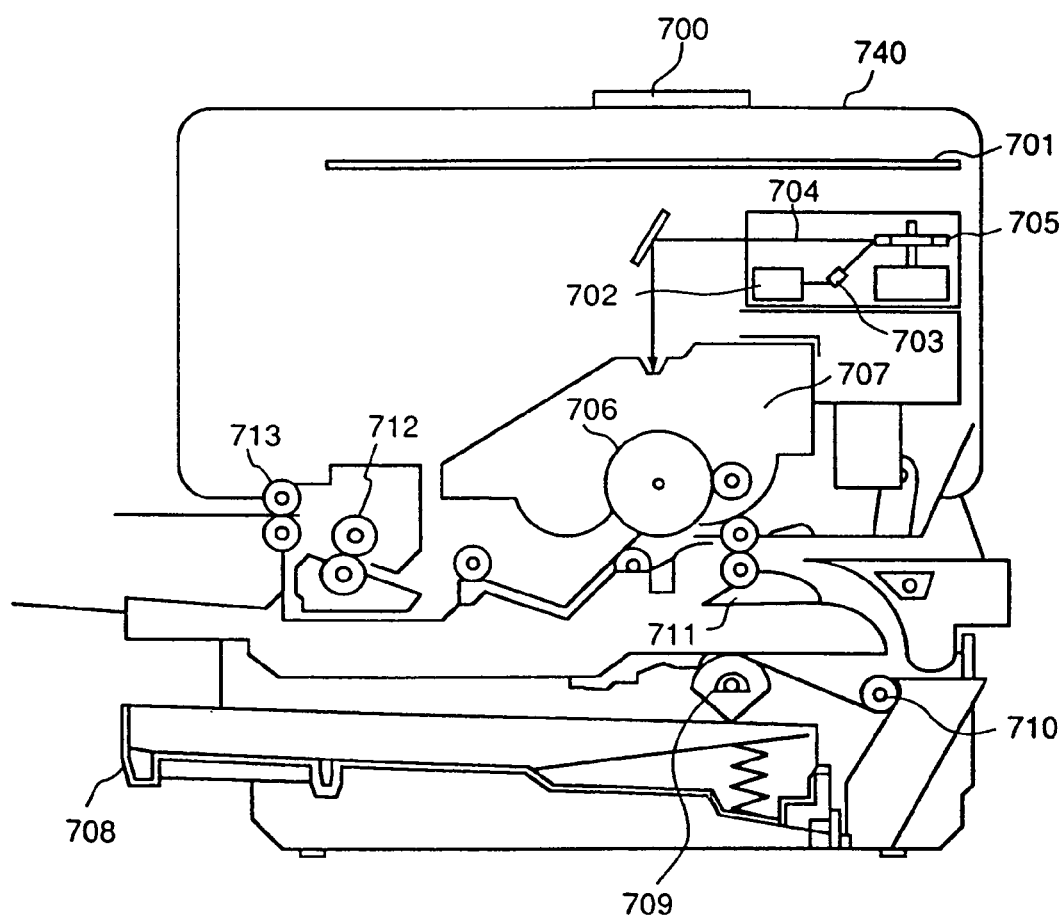
FIG. 3 is a sectional view showing the structure of the printer of the first embodiment.

In FIG. 3, reference numeral 740 denotes a LBP body. The LBP body 740 receives character information (character codes), form information, or a macro instruction from a host computer connected externally, stores it, creates a character pattern or form pattern according to the information, and produces an image on recording paper or a recording medium. 700 denotes an operation panel on which operating switches and an LCD are arranged. 701 denotes a printer control unit for controlling the whole of the LBP 740 and analyzing character information supplied from the host computer. The control unit 701 converts a character into a video signal representing a corresponding character pattern and outputs it to a laser driver 702. The laser driver 702 is a circuit for driving a semiconductor laser 703 and turning on or off a laser beam 704 emanating from the semiconductor laser 703 according to an input video signal. The laser beam 704 is deflected laterally by means of a rotary polygon mirror 705, thus scanning an electrostatic drum 706. An electrostatic latent image of a character pattern or the like is formed on the electrostatic drum 706. The latent image is developed by a developing unit 707 surrounding the electrostatic drum 706, and then transferred to recording paper.

Cut sheets of paper are used as recording paper. Cut sheets of recording paper are stowed in a paper cassette 708 mounted in the LBP 700, taken in by a paper feed roller 709 and transport rollers 710 and 711, and then supplied to the electrostatic drum 706. A toner image formed on the electrostatic drum 706 by the developing unit 707 is transferred onto carried recording paper. Thereafter, the recording paper is transported toward a fuser 712. Toner is fused on the recording paper. Finally, the recording paper is ejected externally by means of ejection rollers 713.

Figure 1:
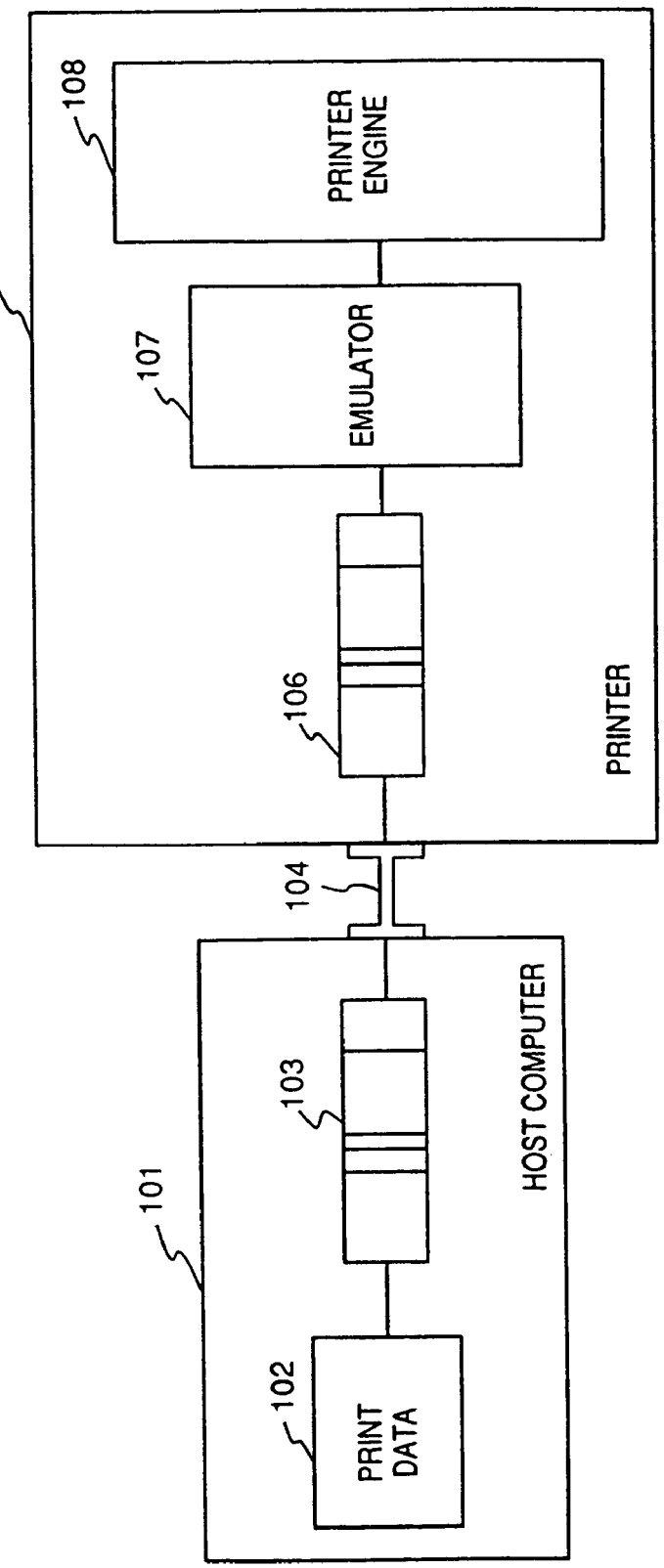
FIG. 1 is a conceptual diagram showing processes adopted in a conventional printer.
Figure 2:
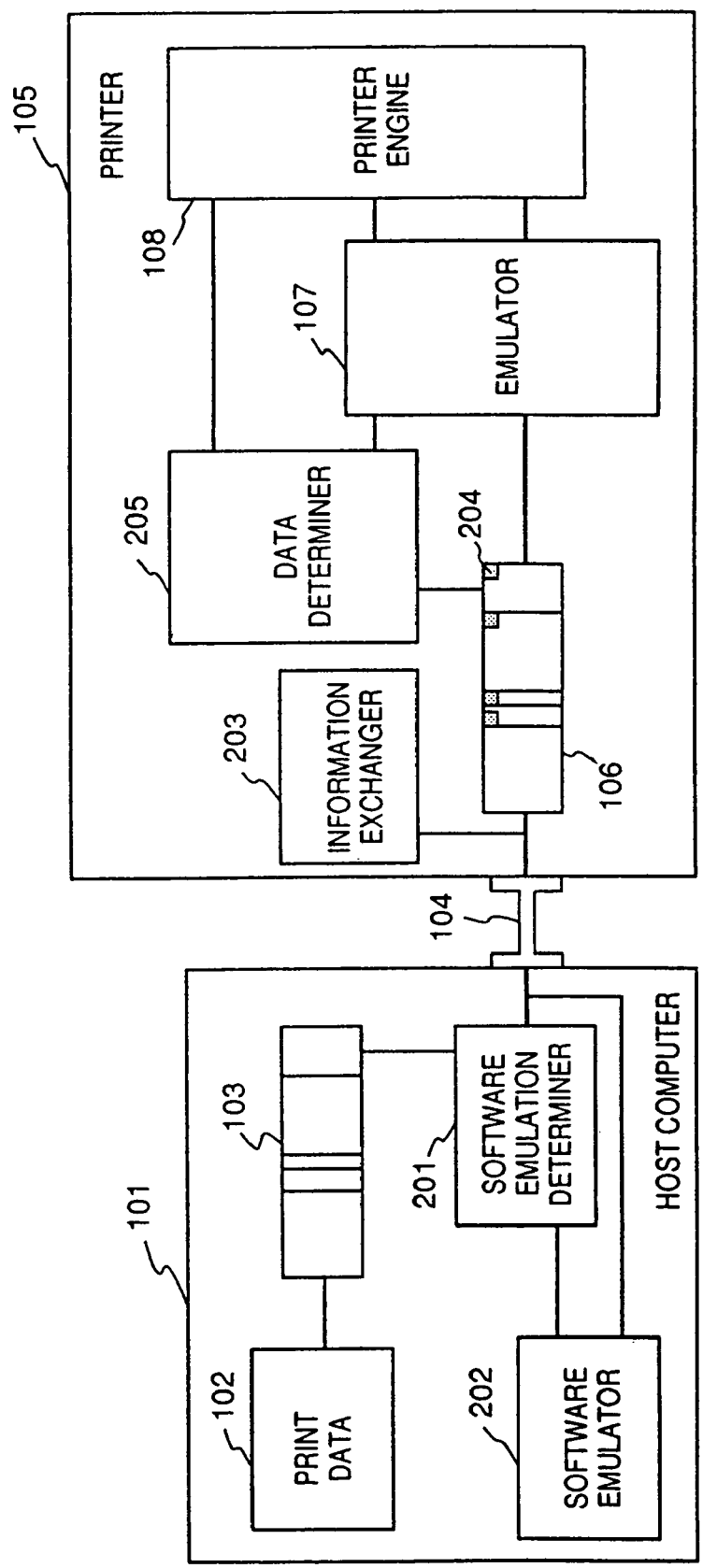
FIG. 2 is a conceptual diagram showing processes adopted in a printer of a first embodiment.

FIG. 2 is a functional block diagram showing a system (comprising a host computer and a printer) in accordance with the first embodiment. Components having the same functions as those described in conjunction with FIG. 1 are assigned the same reference numerals.

In FIG. 2, reference numeral 201 denotes a software emulation determiner for determining the state of the printer and determining whether print data should be expanded and then transmitted or left unprocessed and then transmitted. 202 denotes a software emulator for expanding print data sent from the software emulation determiner 201 into a bit map image.

Reference numeral 203 denotes an information exchanger for exchanging information with a host computer 102. 204 denotes a flag indicating whether or not data concerned has already been expanded. 205 denotes a data determiner for checking the flag 204 in a spool file so as to determine a data transmission destination.

In FIG. 2, spool files received from the host computer 101 are sequentially saved (queued) in a spooler 106 (preserved in a storage such as a hard disk).

A channel 104 differs from the one shown in FIG. 1 in a point that the channel 104 enables bi-directional data transfer.

A job stream employed in the embodiment having the foregoing components will be described below.

When print data is input to the host computer 101 (an operator gives a print instruction to an application program running under the host computer), the data 102 to be printed (hereinafter, a unit of work for handling one print data set is referred to as a job) is temporarily saved in the spooler 103. The software emulation determiner 201 issues a given command so as to inquire about the number of spool files residing in the printer 105 at that time.

In response to the command, the information exchanger 203 in the printer detects the number of spool files saved in the spooler 106 at that time and returns the detected number of spool files to the host computer 101 in the form of a given format.

The software emulation determiner 201 in the host computer 101 receives the data, detects the number of spool files queued in the printer 105, compares the number of spool files with a predetermined value, and thus determines the length of a job queue existent in the printer 105. When detecting that the number of queued spool files, which are representations of jobs, is large, the software emulation determiner 201 activates the software emulator 202 in the host computer 101 and instructs the software emulator 202 to handle a job. Thus, the software emulator 202 performs the same processing as the emulator 107 in the printer so as to produce bit map data. The (job completion) flag 204 indicating that a step of producing bit map data is completed is then set to one. The bit map data is then transferred together with the flag to the printer 105 via the channel 104.

When detecting that only a small number of spool files or jobs are queued in the printer 105, the software emulation determiner 201 resets the job completion flag 204 to zero and transfers print data (described using a printer language that can be interpreted by the printer 105) contained in a spool file in the spooler 103 together with the flag to the printer 105.

As a result, data that has been expanded into a bit map and data that has not been expanded coexist in the spooler 106 in the printer 105. The data sets are distinguished from each other by checking the job completion flags 204 appended thereto. The distinguishing is achieved by the data determiner 205. Data, to which the job completion flag 204 that is set to one is appended, is transferred directly to a printer engine 108 (See FIG. 3) according to a given procedure, whereby printing is achieved. Data, to which the job completion flag 204 that is reset to zero is appended, is passed to the emulator 107, and then normally analyzed and expanded. Resultant bit map data is transferred to the printer engine 108 for the purpose of printing.

Figure 4:
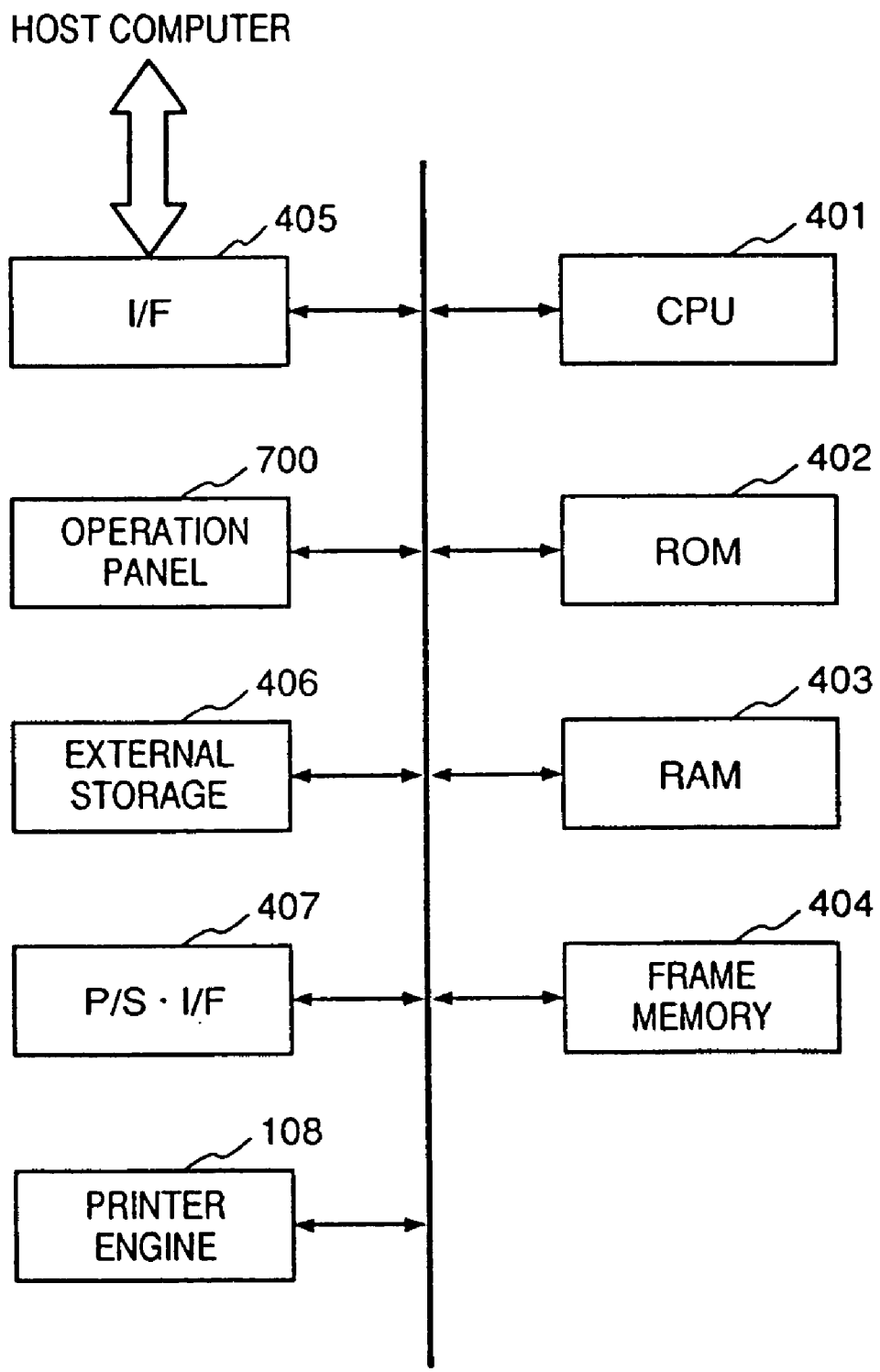
FIG. 4 is a block diagram showing the printer of the first embodiment.

FIG. 4 is a block diagram showing the printer of the embodiment more particularly. The host computer has the same configuration as a normal one. Programs to be described later should merely be installed in the host computer. No mention will therefore be made of the host computer.

In FIG. 4, reference numeral 401 denotes a CPU responsible for control of the whole printer. 402 denotes a ROM storing procedures (corresponding to programs described in the flowcharts of FIGS. 6 and 7) that describe actions taken by the CPU 401. 403 denotes a RAM used as a work area by the CPU 401. Font data (representing outline fonts) is stored in the ROM 402. The CPU 401 operates as a processing unit for the information exchanger 203, data determiner 205, or emulator 107 in FIG. 2. 404 denotes a frame memory having a storage capacity that is large enough to expand print data into bit map data concerning one page.

Reference numeral 405 denotes an interface for receiving print data from the host computer or transmitting status information from the printer. 406 denotes a large-capacity external storage realized with a hard disk or the like. Savers (corresponding to the spooler 106 in FIG. 2) of spool files and data representing various fonts are stored in the storage 406. 407 denotes a P/S interface for converting data instructed under the control of the CPU 401 into serial data synchronously with a known BD signal sent from the printer engine 168 and transmitting the serial data as a video signal into the printer engine 108.

Figure 5:
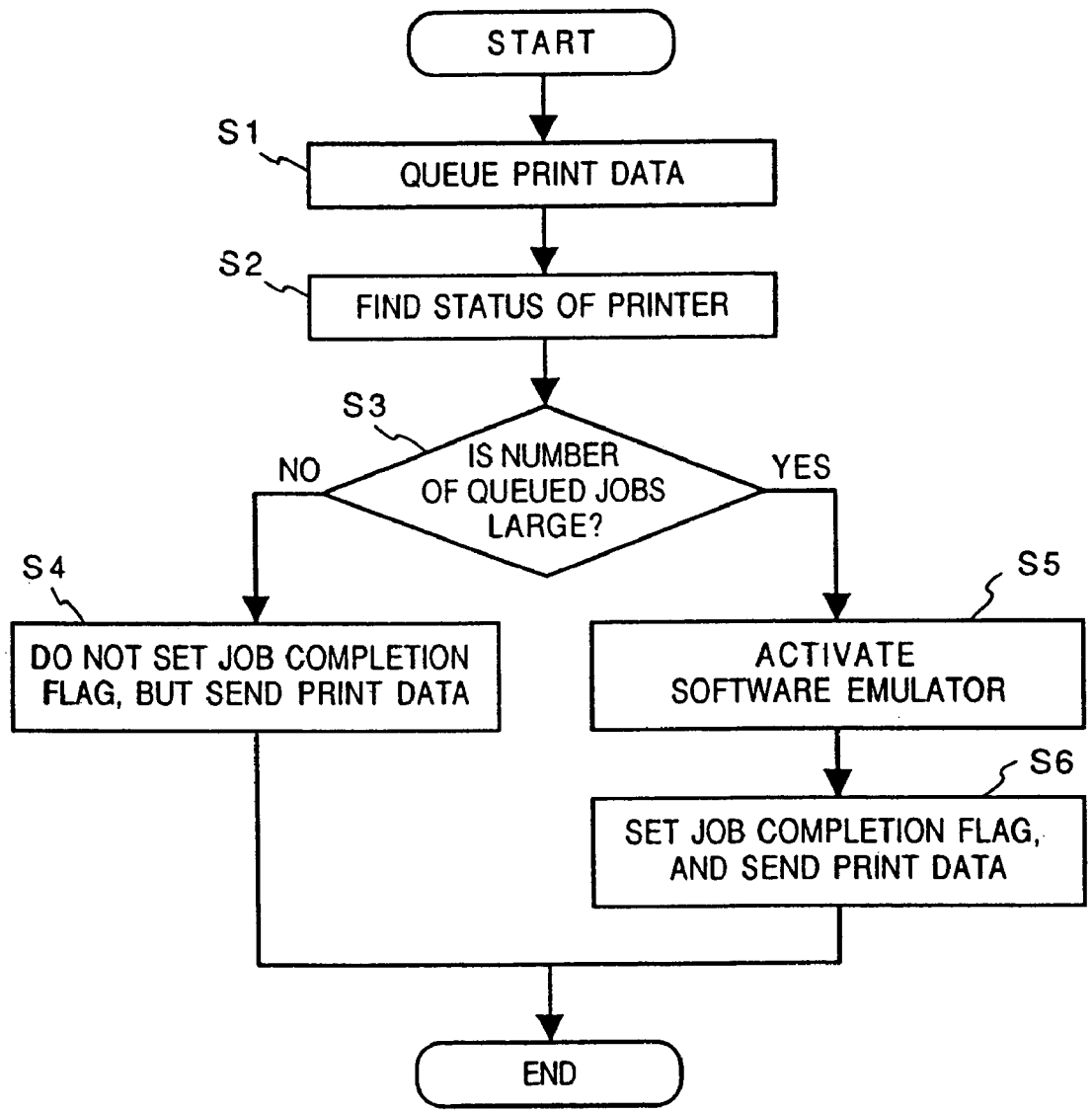
FIG. 5 is a flowchart describing a procedure followed by a host computer in the first embodiment.

Prior to actions taken by the above components, a procedure of transmitting print data to be executed by the CPU (not shown) in the host computer will be described in conjunction with the flowchart of FIG. 5.

First, a print instruction is received. At step S1, data for use in transmitting print data to the printer 105 is produced and then queued in a hard disk (not shown). At step S2, a given command (status request command) is transmitted to the printer 105 in order to find the current state of the printer 105 (that is, the number of unprocessed jobs).

Next, control is passed to step S3. The found number of unprocessed or queued jobs is compared with a given threshold in order to determine whether the number of queued jobs is large.

If the number of queued jobs is small, control is passed to step S4. The job completion flag is not set (remains reset), and the flag and print data are sent to the printer.

When it is determined that the number of unprocessed or queued jobs is large, control is passed to step S5. Processing similar to the one performed by the emulator in the printer is performed; that is, bit map expansion is executed in the host computer. After bit map data is produced, the job completion flag is set to one. The flag and bit map data are transmitted as print data to the printer.

Next, a procedure describing actions taken by the CPU 401 in the printer in FIG. 4 will be described in conjunction with FIGS. 6 and 7.

Figure 6:
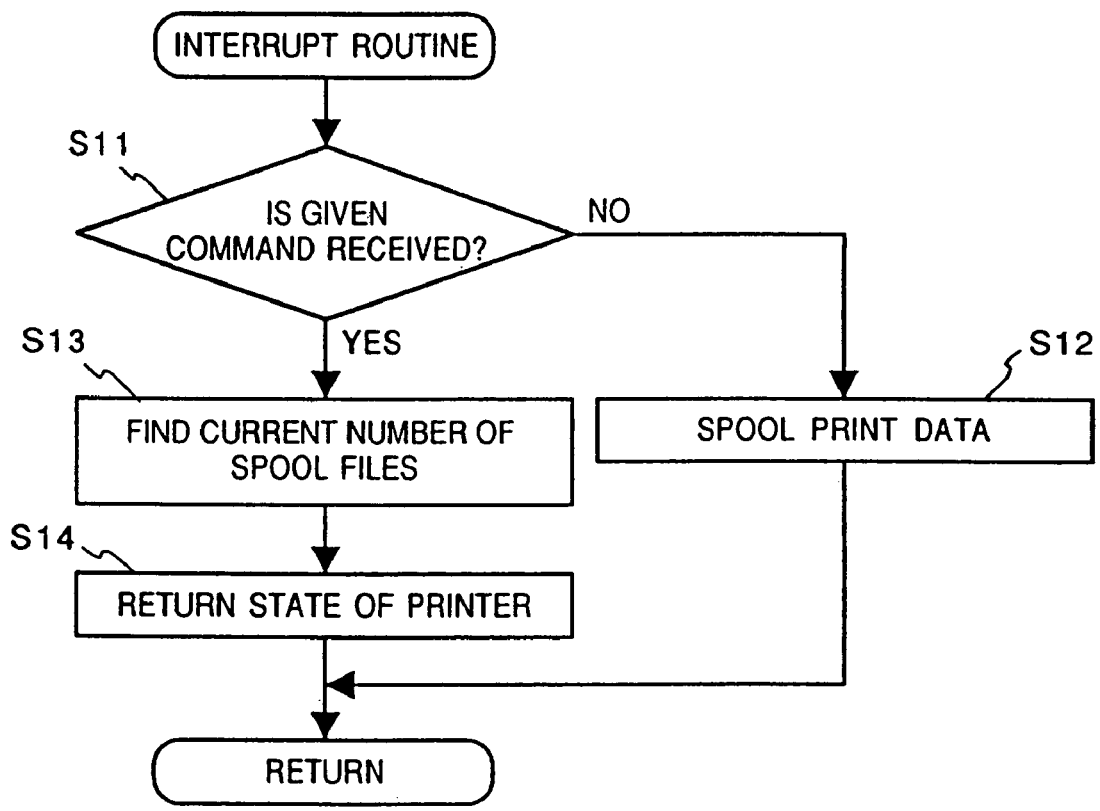
FIG. 6 is a flowchart describing the contents of interruption performed by the printer of the first embodiment.
Figure 7:
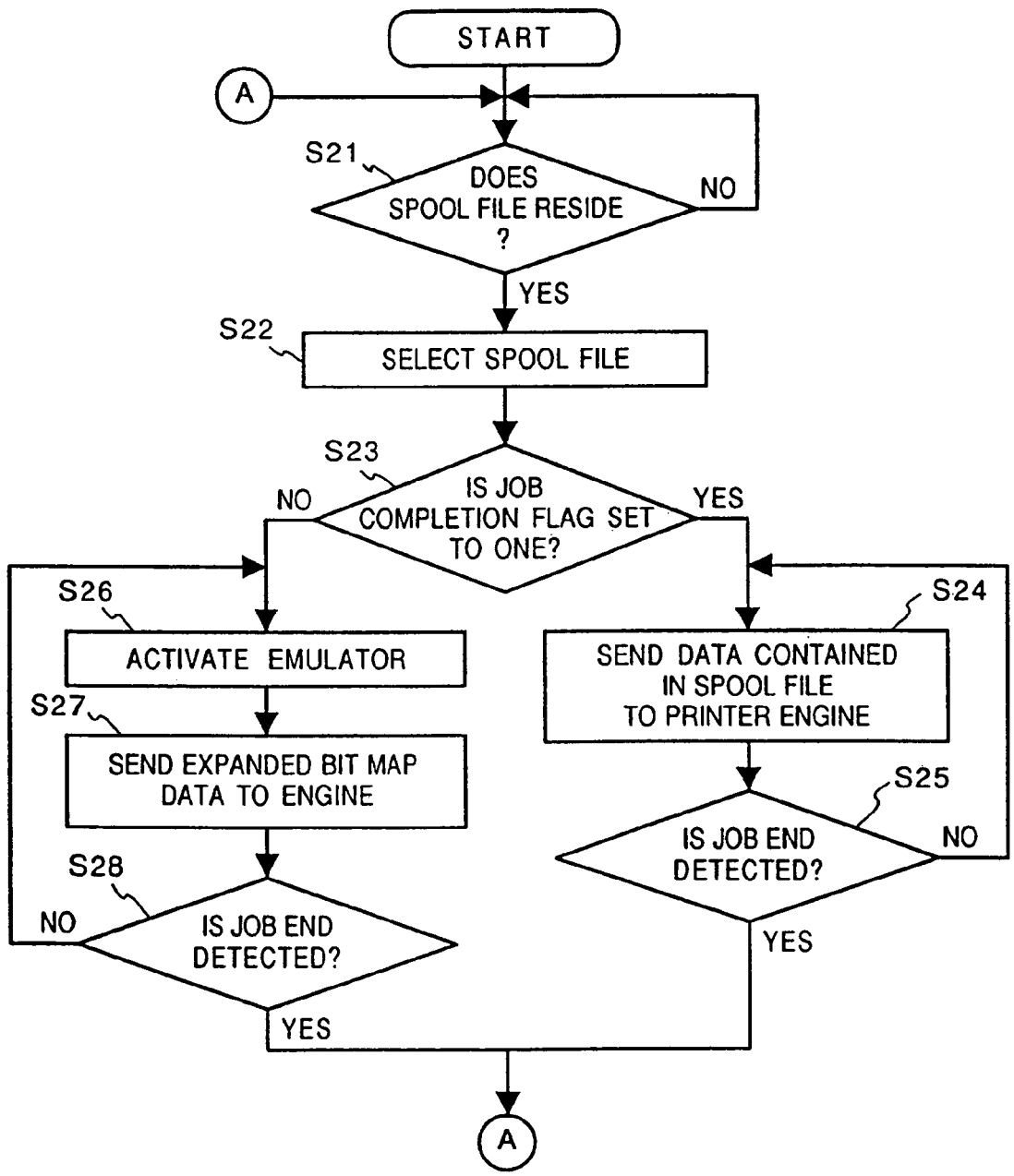
FIG. 7 is a flowchart describing a main routine of printing performed by the printer of the first embodiment.

FIG. 6 shows a routine that when the host computer transmits data to the printer, is executed with an interrupt signal sent from the interface 405.

First, at step S11, it is determined whether received data is a status request command requesting the state of the host computer. If it is determined that the received data is not the request command or is print data, control is passed to step S12. The print data is saved in the form of a spool file in the external storage 406. At this time, if the print data is recognized as the start of a job, the new job is placed in a job management table (which is supposed to be created in the external storage 406) that is not shown. Printing proceeds according to the contents of the table.

If it is determined that the received data is the status request command, control is passed to step S13. The job management table is then referenced (the external storage 406 may be referenced directly, but referencing of the table leads to faster processing) in order to find the number of currently unprocessed jobs. The number of unprocessed jobs is arranged according to a given format, and returned to the host computer.

Next, printing actually performed in the printer will be described in conjunction with the flowchart of FIG. 7.

First, at step S21, the job management table is referenced to determine whether an unprocessed (queued) spool file (that is a representation of a job) resides in the external storage 406. A wait state is set until a job is found.

If it is determined that an unprocessed job resides, control is passed to step S22. One job is selected (the first job placed in the job management table is selected). At step S23, the job completion flag appended to the start of the job is checked.

If the job completion flag is set, the job is bit map data. This means that neither command interpretation nor bit map expansion is necessary. In this case, control is passed to step S24. The bit map data is read, and transferred to the printer engine 108 via the PS interface 407. Printing is then performed. The processing of step S24 is repeated until a job end is detected at step S25.

If the job completion flag appended to the selected job is reset to zero, control is passed to step S26. The emulator is activated. Command interpretation is executed, and print data is placed and expanded in the frame memory 404. When bit map data concerning one page is expanded in the frame memory 404, control is passed to step S27. The expanded bit map data is transferred to the printer engine. Steps S26 and 27 are repeated until a job end is detected at step S28.

As mentioned above, when the job completion flag is set to one, bit map data read from the external storage 406 is transferred directly to the printer engine. Alternatively, the bit map data may be expanded in the frame memory 404 and then transmitted.

In the foregoing embodiment, the length of a job queue in the printer is determined by checking the number of unprocessed jobs. The present invention is not limited to this working mode.

As described previously, the processing speed attained by a printer is higher relative to a job saved as bit map data than relative to print data described in page description language. It is therefore conceivable that information (which can be acquired by checking the job completion flag) for use in determining whether each job is bit map data or data described in page description language is stored in the job management table, and that information representing a job queue length is produced using the job management table and then returned to the host computer. In general, as long as bit map data is concerned, time required for printing can be quantitatively determined on the basis of the amount of the data. However, as long as data described in page description language is concerned, the time required for printing cannot be determined accurately on the basis of the amount of data alone. It is, however, true that the amount of data and the time required to complete printing have some relation to each other. Typical values are therefore adopted as a reference amount of data and reference time required to complete printing. When a new job is accepted, information representing time required to start printing is returned to the host computer.

Based on the information, the host computer automatically activates the emulator and determines whether bit map data or data written in page description language should be transferred. Alternatively, depending on the purpose of use, an operator may be able to determine whether bit map data or data written in page description language should be transferred. The time required to start printing may be displayed in a screen, thus prompting the operator for an instruction.

In the aforesaid embodiment, the number of unprocessed jobs is checked to determine the length of a job queue in the printer. Alternatively, high-speed emulation may be realized by storing an emulation speed permitted by a currently connected printer in a host computer and by comparing an emulation speed (which is stored in advance) permitted by software in the host computer with the stored speed.

In the aforesaid embodiment, a laser beam printer is adopted as a printer. The present invention is not restricted to the laser beam printer. As far as a facility for creating spool files is included, the present invention can be implemented in a printer in which a print head is moved for scanning (for example, an ink-jet printer, a thermal transfer printer, a wire dot hammer printer). Needless to say, the present invention is adaptable to an LED printer or any other type of page printer. However, the creation of spool files has significant meaning with respect to a printer that has some appreciated capabilities and that is used frequently, and is more advantageous to a printer permitting high-speed printing; such as, a page printer or the like.

In the aforesaid embodiment, when a job completion flag appended to a job is set, the job is considered as bit map data. Alternatively, when a printer can selectively print recording media (paper) of a plurality of sizes, information representing a size of a recording medium (or the number of dots comprising one scanning line) is needed. Not all such jobs are therefore bit map data.

In the aforesaid embodiment, the host computer transmits the status request command through the same channel as it transmits normal print data. The request may be issued to the printer by changing logic levels of a signal sent over a dedicated signal line.

In the aforesaid embodiment, the host computer determines whether or not to activate the emulator, and transfers a set or reset flag to the printer. Alternatively, this procedure may be implemented in a stand-alone unit interposed between the host computer and printer. In this case, a memory having a certain capacity is incorporated or mounted in the stand-alone unit.

As described so far, according to the first embodiment, an intended result of printing can be provided quickly according to the state of a printer.

Next, the second embodiment of the present invention will be described in detail with reference to the drawings.

Figure 8:
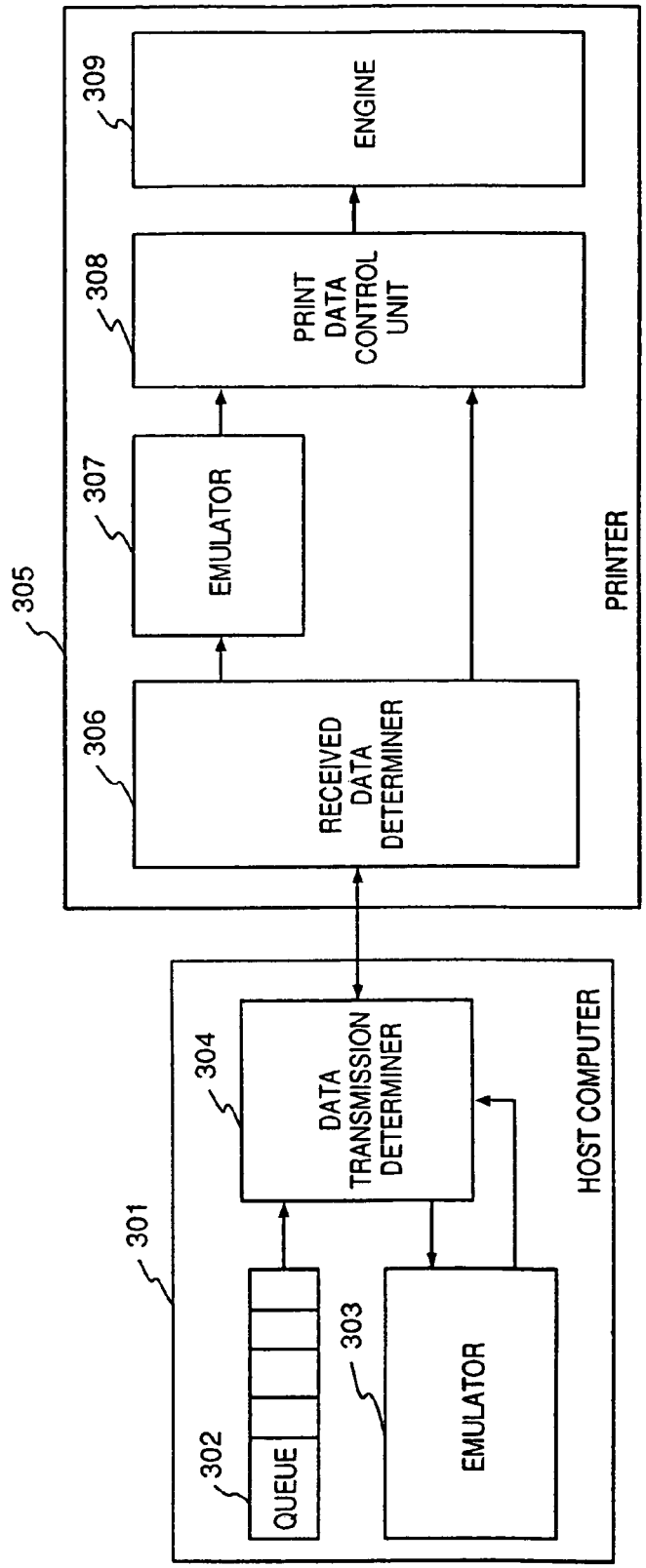
FIG. 8 is a block diagram showing the components of a host computer and a printer in the second embodiment.

FIG. 8 is a block diagram showing the components of a host computer and a printer in accordance with the second embodiment. In FIG. 8, reference numeral 301 denotes a host computer. 305 denotes a printer. 302 denotes a queue containing data written in printer language. 303 denotes an emulator for expanding data contained in the queue 302 into a bit map image. 304 denotes a data transmission determiner for determining whether data placed in the queue 302 or a bit map image expanded by the emulator 303 should be transmitted to the printer 305.

Reference numeral 306 denotes a received data determiner for receiving data from the host computer 301 and determining whether the received data is a bit map image or data written in printer language. 307 denotes an emulator for expanding data written in printer language into a bit map image. 308 denotes a print data control unit for controlling the order of print data. 309 denotes an engine for achieving printing according to an expanded bit map image.

The actions of the host computer 301 and printer 305 in the embodiment having the foregoing components will be descried with reference to the flowchart of FIG. 9.

First, a user runs an application program or the like under the host computer 301 and executes printing. Print data is then placed in the queue 302 (step S101). The data transmission determiner 304 determines whether data should be expanded into a bit map image under the host computer 301 (step S102). The determination will be described in detail. If it is determined that data should be expanded into a bit map image under the host computer 301 (step S103), the data is sent to the emulator 303 and expanded into a bit map image (step S104), and then sent to the printer 305 (step S105). If it is determined that data written in printer language should be transmitted to the printer 305 as it is (step S103), the data is sent to the printer 305 as it is (step S105).

In the printer 305, the received data determiner 306 receives data and determines whether the received data is a bit map image or data written in printer language (step S106). If it is determined that the received data is data written in printer language (step S107), the emulator 307 expands the data into a bit map image (step S108) and sends the image to the print data control unit 308 (step S109). If it is determined that the received data is a bit map image (step S107), the data is sent to the print data control unit 308 as it is (step S109). The print data control unit 308 supervises the order of print data. When print data received is not the data that should be printed next, the print data is spooled and correct data is waited. When correct data is received, the data is first sent to the engine 309 (step S110).

The foregoing determination made by the data transmission determiner 304 will be described with reference to the flowchart of FIG. 10.

First, data is received from the queue 302 (step S201). It is then determined whether the received data is concerned with an odd page (step S202). If the received data is concerned with an odd page, the data is sent to the printer 305 (step S203). However, if the received data is concerned with an even page, the data is sent to the emulator 303 (step S204). It is then determined whether data still resides (step S205). If data resides, control is returned to step S201 and the determination is repeated. If no data resides, the determination is terminated.

<Variant>

Figure 10:
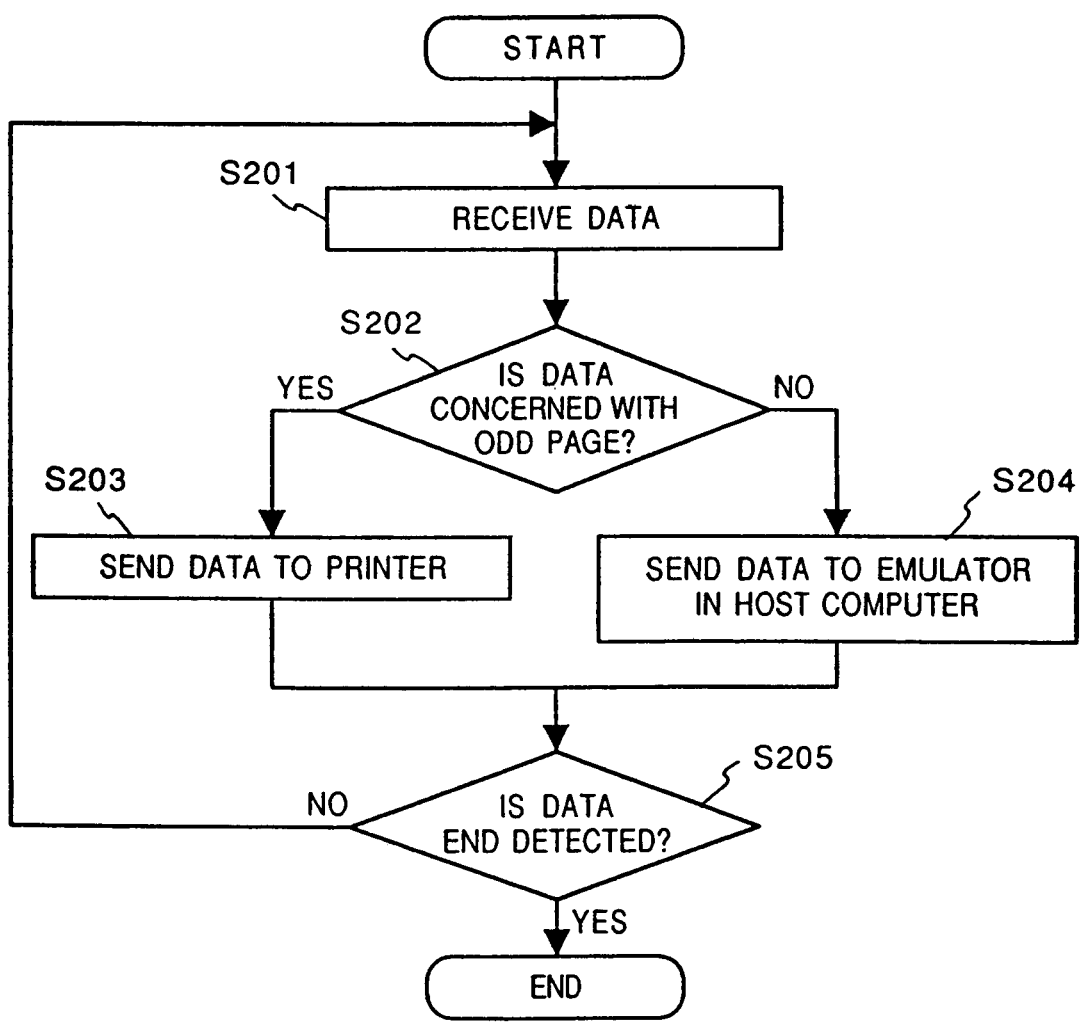
FIG. 10 is a flowchart describing determination performed by a data transmission determiner in the second embodiment.

At step S202 in FIG. 10, data concerning an even page is sent to the emulator and then to the printer 305. Data corresponding to an odd page is sent directly to the printer 305. On the contrary, data concerning an odd page may be sent to the emulator 303 and then to the printer 305, while data concerning an even page may be sent directly to the printer 305.

In the embodiment, print data is sent to the emulator 303 and then to the printer 305 in units of a page, or print data is sent directly to the printer 305. Alternatively, it is understood that print data may be analyzed in order to estimate the time required for the emulator 307 to expand the print data into a bit map image and the time required for the emulator 303 to expand the print data into a bit map image, and then the transmission destinations of data and the order of transmitting data may be determined on the basis of the estimated times. For example, it is estimated that three seconds would be required for the emulator 303 to complete expanding data concerning the first and second pages into bit map images and for the engine 309 to complete printing the resultant data. It is estimated that thirty seconds would be required for the emulator 307 to complete expanding data concerning the third page into a bit map image. In this case, the data transmission determiner 304 first transmits the data concerning the third page to the emulator 307, and then the data concerning the first and second pages to the emulator 303. Thus, the object of the present invention can be accomplished.

As described so far, according to the second embodiment, a means for expanding data written in printer language into a bit map image is installed in a host computer. Using this means in combination with a bit map image expanding means installed in a printer, an engine can be utilized fully.

The present invention may apply to a system comprising a plurality of equipment or to an apparatus including a sole equipment.

Needless to say, the present invention is adaptable to a system or an apparatus to which the aforesaid programs are installed.

As described, according to the second embodiment, a transmitting side determines whether data written in printer language should be transmitted or the data should be expanded into a bit map image and then transmitted. When receiving data written in printer language, a receiving side expands the data into a bit map image, controls the order of printing based on the bit map image, and thus achieves printing effectively.

As many apparently widely different embodiments of the present invention can be made without departing from the spirit and scope thereof, it is to be understood that the invention is not limited to the specific embodiments thereof except as defined in the appended claims.

What is claimed is:

1. A control method for a host computer connected to a printer, where a bit map image is printed at the printer based on data described in a printer language, said control method comprising:

a determination step of determining whether the data described in the printer language is transmitted to the printer or expanded into a bit map image before transmission, on the basis of a time required to expand the data into the bit map image; and a transferring step of transferring the data described in the printer language to the printer if it is determined in said determination step that the data is transmitted, and expanding the data into the bit map image to transfer the bit map image to the printer if it is determined that the data is expanded into the bit map image before the transmission, wherein, in said determination step, the time required for the printer to expand the data into the bit map image and the time required for the host computer to expand the data into the bit map image are estimated, and if a process that the printer expands a page of data into a bit map image can be performed in parallel with a process that the host computer expands the other page of data into a bit map image, it is determined that the page of data is transmitted as data described in the printer language and the other page of data is expanded into a bit map image before the transmission.

2. A control method according to claim 1, wherein, in said determination step, if it is to be expected that the printer can expand a page of data following a plurality of preceding pages of data into a bit map image while the host computer expands the first plurality of preceding pages of data into bit map images, it is determined that the page following the plurality of preceding pages of data is transmitted as data described in the printer language.

3. A host computer connected to a printer, where a bit map image is printed at the printer based on data described in a printer language, said host computer comprising:

determination means for determining whether the data described in the printer language is transmitted to the printer or expanded into a bit map image before transmission, on the basis of a time required to expand the data into the bit map image; and transferring means for transferring the data described in the printer language to the printer if it is determined by said determination means that the data is transmitted, and expanding the data into the bit map image to transfer the bit map image to the printer if it is determined that the data is expanded into the bit map image before the transmission, wherein the determination means estimates the time required for the printer to expand the data into the bit map image and the time required for the host computer to expand the data into the bit map image, and determines that, if a process that the printer expands a page of data into a bit map image can be performed in parallel with a process that the host computer expands the other page of data into a bit map image, the page of data is transmitted as the data described in the printer language and the other page of data is expanded into a bit map image before the transmission.

4. A computer-readable medium having code stored thereon with computer-executable process steps of control method for a host computer connected to a printer, where a bit map image is printed at the printer based on data described in a printer language, said process steps comprising:

a step of determining whether the data described in the printer language is transmitted or expanded into a bit map image before transmission, on the basis of a time required to expand the data into the bit map image; and a step of transferring the data described in the printer language to the printer if it is determined that the data is transmitted, and expanding the data into the bit map image to transfer the bit map image to the printer if it is determined that the data is expanded into the bit map image before the transmission, wherein, in said determining step, the time required for the printer to expand the data into the bit map image and the time required for the host computer to expand the data into the bit map image are estimated, and if a process that the printer expands a page of data into a bit map image can be performed in parallel with a process that the host computer expands the other page of data into a bit map image, it is determined that the page is transmitted as data described in the printer language and the other page is expanded into the bit map image before the transmission.

* * * * *